United States Patent Office 3,558,603
Patented Jan. 26, 1971

3,558,603
PROCESS FOR PRODUCING BENZODIAZEPINE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, and Tsuyoshi Kobayashi, Minoo-shi, Japan, assignors to Sumitomo Chemical Company, Ltd., Osaka, Japan, a corporation of Japan
No Drawing. Filed Nov. 27, 1968, Ser. No. 779,619
Claims priority, application Japan, Dec. 1, 1967,
42/77,238; Feb. 13, 1968, 43/8,953
Int. Cl. C07d 53/06
U.S. Cl. 260—239.3                                           5 Claims

ABSTRACT OF THE DISCLOSURE

Benzodiazepine derivatives having excellent tranquillizing effects and represented by the formula:

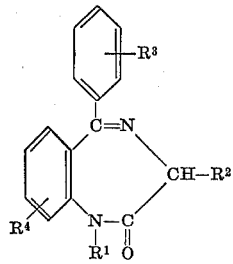

wherein $R^1$ is hydrogen, lower ($C_1$–$C_3$) alkyl, lower ($C_1$–$C_3$) haloalkyl, lower ($C_3$–$C_5$) alkenyl or ($C_3$–$C_6$) cycloalkylmethyl; $R^2$ is lower ($C_1$–$C_3$) alkyl, benzyl or phenyl; $R^3$ and $R^4$ each is hydrogen, halogen, lower ($C_1$–$C_3$) alkyl, lower ($C_1$–$C_3$) haloalkyl or lower ($C_1$–$C_3$) alkoxy; are produced by reacting a 2-aminomethyl-indole derivative of the formula:

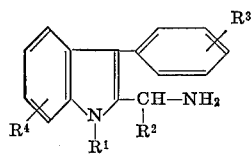

wherein $R^1$, $R^2$, $R^3$ and $R^4$ have the same meanings as defined above, or a salt thereof with an appropriate oxidizing agent.

---

This invention relates to a process for producing benzodiazepine derivatives. More particularly, the invention pertains to a process for preparing benzodiazepine derivatives which have prominent tranquillizing, muscle-relaxant, spasmolytic and hypnotic effects, and which are represented by the formula:

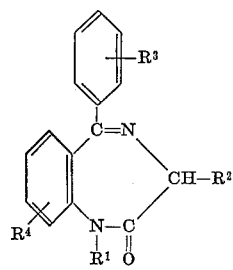

wherein $R^1$ is hydrogen, lower ($C_1$–$C_3$) alkyl, lower ($C_1$–$C_3$) haloalkyl, lower ($C_3$–$C_5$) alkenyl or ($C_3$–$C_6$) cycloalkylmethyl; $R^2$ is lower ($C_1$–$C_3$) alkyl, benzyl or phenyl; $R^3$ and $R^4$ each is hydrogen, halogen, lower ($C_1$–$C_3$) alkyl, lower ($C_1$–$C_3$) haloalkyl or lower ($C_1$–$C_3$) alkoxy;

PRIOR ARTS

The benzodiazepine derivatives represented by the Formula I show potent tranquillizing muscle-relaxant, spasmolytic and hypnotic actions [cf. L. H. Sternback et al.: J. Org. Chem. 27, 378 (1962)]. As methods for preparing said benzodiazepine derivatives, several processes have been known. For example, a benzodiazepine derivative is obtained by reacting a 2-aminobenzophenone derivative with α-substituted glycine derivative hydrochloride or its ethyl ester to yield an N-unsubstituted benzodiazepine derivative (cf. German Pat. No. 1,145,626) and then, if necessary, alkylating the resultant N-unsubstituted benzodiazepine derivative to give an N-alkylated benzodiazepine derivative. [cf. L. H. Sternback et al.: J. Org. Chem., 27, 3788 (1962)]. A benzodiazepine derivative is also prepared by treating a bromoacetamido-benzophenone derivative with ammonia. [cf. L. H. Sternback et al.: J. Org. Chem., 27, 3788 (1962) and German Pat. 1,136,709].

On the contrary to these procedures, we have found, unexpectedly, that a benzodiazepine derivative having the Formula I can be prepared smoothly and economically in high yield and high purity by reacting a 2-aminomethyl-indole derivative having the formula:

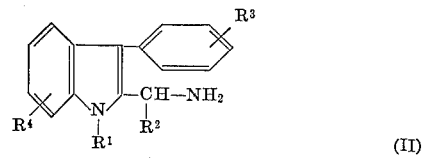

wherein $R^1$, $R^2$, $R^3$ and $R^4$ have the same meanings as defined above, or its salt with an appropriate oxidizing agent. Such a process for converting a 5-membered ring compound in to a 7-membered ring compound by ring expansion reaction has not heretofore been described or suggested in the literature. Therefore, the novel process of the present invention is unobvious from known methods, and moreover very much useful and unexpected procedure.

A novel starting 2-aminomethyl indole derivatives is prepared easily by the reduction of indole-2-iminoalkyl derivatives, which is given by contacting the indole-2-carbonitrile derivatives with an alkylmagnesium halide.

All of these processes proceed smoothly and give the objective products in high yields, so these procedures are very much useful in practice.

One object of the present invention is to provide a novel process for preparing the benzodiazepine derivative represented by the Formula I or salt thereof.

Other objects of the present invention will be apparent from the following description.

In order to accomplish these objects, the present invention provides a process for preparing the benzodiazepine derivative represented by the Formula I, which comprises, reacting the 2-aminomethylindole derivative represented by the Formula II or its salt with an oxidizing agent.

In the compounds of the present invention, examples of the halogen include chlorine, bromine, iodine and fluorine; the lower alkyl is a group having 1 to 3 carbon atoms, examples of which include methyl, ethyl n-propyl, and iso-propyl, examples of the lower alkenyl include allyl, butenyl and pentenyl; the lower haloalkyl is a group having 1 to 3 carbon atoms, examples of which include 2,2,2-trifluoroethyl, 2-chloroethyl, and 3-chloropropyl; the lower alkoxy is a group having 1 to 3 carbon atoms, examples of which include methoxy, ethoxy, n-propoxy, and iso-propoxy; the cycloalkyl methyl is a group having 3–6 carbon atoms, examples of which include xyclopropylmethyl, cyclobutylmethyl, cyclopentylmethyl and cyclohexylmethyl.

In carrying out the process for preparing the benzodiazepine derivatives according to the present invention, a 2-aminomethylindole derivative represented by the Formula II or its salt is reacted with an appropriate oxidizing agent, for example, ozone, hydrogen peroxide, peracid (e.g., performic acid, peracetic acid and perbenzoic acid), chromic acid, potassium permanganate or the like. The oxidizing agent used in the process of the invention is not limited, however, only to those exemplified above. The reaction is generally readily effected at room temperature. Higher or lower temperature is sometimes found more satisfactory. Chromic anhydride and ozone are preferred as an oxidizing agent. The reaction may preferably be carried out in the presence of a solvent. The solvent is selected from water, methanol, ethanol, acetone, carbon tetrachloride, acetic acid, sulfuric acid or other inert solvents. The oxidizing agent is used in a stoichiometric amount or more.

In the case of the oxidation carried out by chromic anhydride in acetic acid, it is preferable to use 2 times or more equimolar amount of chromic anhydride at room temperature. A 2-aminoethylindole derivative or its salt such as hydrochloride, hydrobromide, sulfate, nitrate, acetate and the like is dissolved or suspended in a solvent and an oxidizing agent is added thereto with stirring. The reaction is generally completed within 24 hours. And the crude benzodiazepine derivative can be separated from the reaction mixture. The product may be purified, if desired, by recrystallization from an appropriate solvent such as ethanol, isopropanol and the like.

In the present invention, the benzodiazepine derivative (I) is treated with an inorganic acid such as hydrochloric, sulfuric, nitric or phosphoric acid, or an organic acid such as maleic, fumaric, succinic, formic or acetic acid, whereby the salt thereof is obtained.

In accordance with the present invention, the following benzodiazepine derivatives are obtained:

3-methyl-5-phenyl-1,3-dihydro-2H-1,4-benzodiazepine-2-one
7-chloro-3-methyl-5-phenyl-1,3-dihydro-2H-1,4-benzodiazepine-2-one
7-bromo-3-methyl-5-phenyl-1,3-dihydro-2H-1,4-benzodiazepine-2-one
8 (or 6)-chloro-3-methyl-5-phenyl-1,3-dihydro-2H-1,4-benzodiazepine-2-one
9-chloro-3-methyl-5-phenyl-1,3-dihydro-2H-1,4-benzodiazepine-2-one
7-methoxy-3-methyl-5-phenyl-1,3-dihydro-2H-1,4-benzodiazepine-2-one
7-chloro-5-(o-chlorophenyl)-3-methyl-1,3-dihydro-2H-1,4-benzodiazepine-2-one
7-chloro-5-(o-fluorophenyl)-3-methyl-1,3-dihydro-2H-1,4-benzodiazepine-2-one
7-chloro-5-(p-chlorophenyl)-3-methyl-1,3-dihydro-2H-1,4-benzodiazepine-2-one
7-chloro-5-(p-bromophenyl)-1,3-dimethyl-1,3-dihydro-2H-1,4-benzodiazepine-2-one
7-chloro-3-ethyl-5-phenyl-1,3-dihydro-2H-1,4-benzodiazepine-2-one
7-chloro-5-phenyl-3-propyl-1,3-dihydro-2H-1,4-benzodiazepine-2-one
3-benzyl-7-chloro-5-phenyl-1,3-dihydro-2H-1,4-benzodiazepine-2-one
7-chloro-3,5-diphenyl-1,3-diphenyl-1,3-dihydro-2-H-1,4-benzodiazepine-2-one
7-chloro-1,3-dimethyl-5-phenyl-1,3-dihydro-2H-1,4-benzodiazepine-2-one
7-chloro-1-(β-chloroethyl)-3-methyl-5-phenyl-1,3-dihydro-2H-1,4-benzodiazepine-2-one
7-chloro-1-(γ-chloropropyl)-3-methyl-5-phenyl-1,3-dihydro-2H-1,4-benzodiazepine-2-one
7-chloro-3-methyl-5-phenyl-1-(2',2',2'-trifluoromethyl)-1,3-dihydro-2H-1,4-benzodiazepine-2-one
1-allyl-7-chloro-3-methyl-5-phenyl-1,3-dihydro-2H-1,4-benzodiazepine-2-one
7-chloro-1-cyclopropylmethyl-3-methyl-5-phenyl-1,3-dihydro-2H-1,4-benzodiazepine-2-one
7-chloro-1-cyclopentylmethyl-3-methyl-5-phenyl-1,3-dihydro-2H-1,4-benzodiazepine-2-one
1,3,7-trimethyl-5-phenyl-1,3-dihydro-2H-1,3-dihydro-2H-1,4-benzodiazepine-2-one
7-chloro-5-(o-chlorophenyl)-1,3-dimethyl-1,3-dihydro-2H-1,4-benzodiazepine-2-one
7-chloro-5-(o-fluorophenyl)-1,3-dimethyl-1,3-dihydro-2H-1,4-benzodiazepine-2-one
7-chloro-1,3-dimethyl-5-(p-tolyl)-1,3-dihydro-2H-1,4-benzodiazepine-2-one
7-chloro-1,3-dimethyl-5-(p-methoxyl-phenyl)-1,3-dihydro-2H-1,4-benzodiazepine-2-one
7-chloro-1-ethyl-3-methyl-5-phenyl-1,3-dihydro-2H-1,4-benzodiazepine The present invention will be illustrated in further detail with reference to examples, but these examples do not limit the scope of the invention.

EXAMPLE 1

A solution of 3 g. of chromic anhydride in 3 ml. of water is added to a mixture of 3 g. of 2-(1'-amino-ethyl)-5-chloro-3-phenyl-indole hydrochloride and 40 ml. of acetic acid under cooling with stirring. The mixture is stirred at room temperature overnight. The reaction mixture is basified with ammonia water and extracted with benzene. The benzene extract is dried over sodium sulfate and concentrated under reduced pressure, and petroleum ether is added to give 7-chloro-3-methyl-5-phenyl-1,3-dihydro-2H-1,4-benzodiazepine - 2 - one. Recrystallization from benzene-petroleum ether gives the product having M.P. 221–223° C.

EXAMPLE 2

Using the procedure described in Example 1, but replacing 2-(1'-amino-ethyl)-5-chloro-3-phenyl indole hydrochloride by 2-(1'-amino-isopropyl)-5-chloro-3-phenyl-indole hydrochloride, there is obtained 7-chloro-3-isopropyl-5-phenyl-1,3-dihydro-2H-1,4-benzodiazepine-2-one. Recrystallization from ether-petroleum ether gives the product having M.P. 226–227° C.

EXAMPLE 3

Using the procedure described in Example 1, but replacing 2-(1'-amino-ethyl)-5-chloro-3-phenyl-indole hydrochloride by 2-(α-amino-benzyl)-5-chloro-3-phenyl-indole, there is obtained 7-chloro-3,5-diphenyl-1,3-dihydro-2H-1,4-benzodiazepine-2-one, which is recrystallized from 2-ethoxyethanol, M.P. 273° C.

EXAMPLE 4

Using the procedure described in Example 1, but replacing 2-(1'-amino-ethyl)-5-chloro-3-phenyl-indole hydrochloride by 2-(α-amino-benzyl)-5-chloro-1-methyl-3-phenyl-indole hydrochloride, there is obtained 7-chloro-3,5-diphenyl-1-methyl-1,3-dihydro-2H-1,4-benzodiazepine-2-one, which is recrystallized from methanol-benzene, M.P. 223°–224° C.

Similarly, using the procedure described in Example 1, but replacing 2-(1'-amino-ethyl)-5-chloro-3-phenyl-indole hydrochloride by 2-(1'-amino-ethyl)-5-chloro-3-(o-fluorophenyl)-1-methyl-indole hydrochloride, 2-(1'-amino-ethyl)-5-chloro-1-ethyl-3-phenyl-indole hydrochloride, 2-(1'-amino-ethyl)-5-chloro-3-phenyl-1-(2',2',2'-trifluoroethyl)indole hydrochloride, 2-(1'-amino-ethyl)-5-chloro-1-cyclopropylmethyl - 3 - phenyl-indole hydrochloride, 2-(1'-amino-ethyl)-5-methoxy-1-methyl-3-phenyl-indole hydrochloride and 2-(1'-amino-ethyl)-1,5-dimethyl-3-phenyl-indole, there are obtained 7-chloro-5-(o-fluorophenyl)-1,3-dimethyl-1,3-dihydro - 2H - 1,4-benzodiazepine-2-one, 7-chloro-1-ethyl-3-methyl-5-phenyl-1,3-dihydro-2H-1,4-benzodiazepine-2-one, 7-chloro-3-methyl-5-phenyl-1-(2′,2′,2′-trifluoromethyl)-1,3-dihydro-2H-1,4-benzodiazepine-2-one, 7-chloro-1-cyclopropylmethyl-3-methyl-5-phenyl-1,3-dihydro-2H-1,4-benzodiazepine-2-one, 7-methoxy-1,3-dimethyl-5-phenyl-1,3-dihydro-2H-1,4-benzodiazepine-2-one and 1,3,7-trimethyl-5-phenyl-1,3-dihydro-2H-1,4-benzodiazepine-2-one, respectively.

EXAMPLE 5

Ozonized oxygen is passed into a mixture of 3 g. of 2-(α-amino-benzyl)-5-chloro-3-phenyl-indole hydrochloride and 40 ml. of acetic acid at 10° C. for 6 hours. The reaction mixture is diluted with ice-water, neutralized with ammonia water, and extracted with methylene chloride. The organic layer is dried and the solvent is removed under reduced pressure. The residue is recrystallized from methanol-benzene to give 7-chloro-3,5-diphenyl-1-methyl-1,3-dihydro-2H-1,4-benzodiazepine-2-one, M.P. 222–224° C. This product is identical with the product obtained in Example 4.

We claim:
1. A process for producing benzodiazepine derivatives represented by the formula:

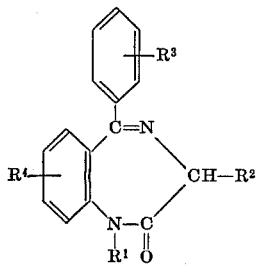

wherein $R^1$ is hydrogen, $C_1$–$C_3$ alkyl, $C_1$–$C_3$ haloalkyl, $C_3$–$C_5$ alkenyl or $C_3$–$C_6$ cycloalkylmethyl; $R^2$ is $C_1$–$C_3$ alkyl, benzyl or phenyl; $R^3$ and $R^4$ each is hydrogen, halogen, $C_1$–$C_3$ alkyl, $C_1$–$C_3$ haloalkyl or $C_1$–$C_3$ alkoxy, or their acid addition salts, which comprises reacting a 2-aminomethylindole derivative represented by the formula:

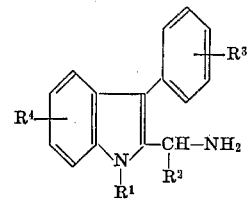

wherein $R^1$, $R^2$, $R^3$ and $R^4$ have the same meanings as defined above, or acid addition salt thereof, with at least the stoichiometric amount of an oxidizing agent selected from the group consisting of ozone, hydrogen peroxide, performic acid, peracetic acid, perbenzoic acid, chromic acid and potassium permanganate in the presence of a solvent.

2. A process according to claim 1, wherein the oxidizing agent is chromic anhydride or ozone and the reaction is carried out at a room temperature.

3. A process according to claim 1, wherein the solvent is water, methanol, ethanol, acetone, carbon tetrachloride, acetic acid or sulfuric acid.

4. A process according to claim 1, the acid in the acid addition salt of said benzodiazepine derivatives is hydrochloric, sulfuric, nitric, phosphoric, maleic, fumaric, succinic, formic or acetic acid.

5. A process according to claim 1, wherein the acid in the acid addition salt of said 2-aminomethylindole derivatives is hydrochloric hydrobromic, sulfuric nitric or acetic acid.

References Cited
UNITED STATES PATENTS 3,371,085   2/1968   Reeder et al. _____ 260—239.3

HENRY R. JILES, Primary Examiner

R. T. BOND, Assistant Examiner

U.S. Cl. X.R.
260—326,13, 326.15